(12) United States Patent
Palevich et al.

(10) Patent No.: US 7,441,012 B2
(45) Date of Patent: *Oct. 21, 2008

(54) NETWORK FILE SYSTEM

(75) Inventors: John H. Palevich, Sunnyvale, CA (US); Martin Taillefer, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 288 days.

This patent is subject to a terminal disclaimer.

(21) Appl. No.: 11/397,482

(22) Filed: Apr. 3, 2006

(65) Prior Publication Data

US 2006/0212539 A1   Sep. 21, 2006

Related U.S. Application Data

(63) Continuation of application No. 11/010,502, filed on Dec. 13, 2004, now Pat. No. 7,080,131, which is a continuation of application No. 09/590,970, filed on Jun. 9, 2000, now Pat. No. 6,889,256.

(60) Provisional application No. 60/138,966, filed on Jun. 11, 1999.

(51) Int. Cl.
*G06F 15/16* (2006.01)

(52) U.S. Cl. .................. 709/217; 709/246; 709/229

(58) Field of Classification Search ............. 709/203, 709/218, 217, 229, 246; 717/163; 707/6
See application file for complete search history.

(56) References Cited

U.S. PATENT DOCUMENTS

| | | | |
|---|---|---|---|
| 5,881,232 A | 3/1999 | Cheng et al. | 709/217 |
| 5,944,780 A | 8/1999 | Chase et al. | 709/201 |
| 5,987,476 A * | 11/1999 | Imai et al. | 707/201 |
| 6,065,043 A | 5/2000 | Domenikos et al. | 709/203 |
| 6,119,153 A * | 9/2000 | Dujari et al. | 709/218 |

(Continued)

FOREIGN PATENT DOCUMENTS

EP   0371229   6/1990

(Continued)

OTHER PUBLICATIONS

PCT International Search Report (mailed Jun. 10, 2002).

(Continued)

*Primary Examiner*—Jungwon Chang
(74) *Attorney, Agent, or Firm*—Workman Nydegger

(57) ABSTRACT

A method and system that combines efficient caching and buffering to provide a network file system, that may utilize data stored in one or more compressed image files of sequentially arranged byte stream data. As an application requests file opens and file reads of a file system, one or more drivers convert the block requests into HTTP: byte range requests or the like in order to retrieve the data from a remote server. As the data is received, it is reconverted and adjusted to match the application's request. Sequential block access patterns can be detected and used to request additional data in a single request, in anticipation of future block requests, thereby increasing efficiency. Local caching of received data, including caching after uncompressing received data that was compressed, further increases efficiency. A compressed file system format optimized for sequential access is also described that when used, further improves the efficient data access.

16 Claims, 7 Drawing Sheets

U.S. PATENT DOCUMENTS

| | | | | |
|---|---|---|---|---|
| 6,163,812 | A | 12/2000 | Gopal et al. | 709/310 |
| 6,163,844 | A | 12/2000 | Duncan et al. | 713/201 |
| 6,185,733 | B1 * | 2/2001 | Breslau et al. | 717/163 |
| 6,192,432 | B1 | 2/2001 | Slivka et al. | 710/68 |
| 6,272,593 | B1 | 8/2001 | Dujari | 711/118 |
| 6,314,456 | B1 | 11/2001 | Van Andel et al. | 709/218 |
| 6,327,608 | B1 | 12/2001 | Dillingham | 709/203 |
| 6,351,750 | B1 | 2/2002 | Duga et al. | 707/102 |
| 6,438,610 | B1 | 8/2002 | Pearson et al. | 709/247 |
| 6,519,626 | B1 * | 2/2003 | Soderberg et al. | 709/203 |
| 6,564,215 | B1 | 5/2003 | Hsiao et al. | 707/8 |
| 6,654,741 | B1 * | 11/2003 | Cohen et al. | 707/6 |
| 6,889,256 | B1 | 5/2005 | Palevich et al. | 709/229 |

FOREIGN PATENT DOCUMENTS

| | | |
|---|---|---|
| EP | 0773503 | 5/1997 |

OTHER PUBLICATIONS

Broadcast Services for Microsoft Windows CE Set-Top Boxes, Jun. 1999, Microsoft Corporation, 1-11.

* cited by examiner

NETWORK FILE SYSTEM

CROSS-REFERENCE TO RELATED APPLICATION

This is a continuation of U.S. patent application Ser. No. 11/010,502, filed Dec. 13, 2004, now U.S. Pat. No. 7,080,131, which is a continuation of U.S. patent application Ser. No. 09/590,970 filed Jun. 9, 2000, now U.S. Pat. No. 6,889,256, which claims priority to U.S. Patent Application Ser. No. 60/138,966 filed Jun. 11, 1999, each of which are hereby incorporated by reference.

FIELD OF THE INVENTION

The present invention relates generally to computer devices and networks, and more particularly to network file storage and access by computer-related devices.

BACKGROUND OF THE INVENTION

Many methods exist for computer devices to access read-only data on a server across a network. Such methods include network file systems, application installation servers, and archived file systems retrieved from FTP (File Transfer Protocol) or HTTP (Hypertext Transfer Protocol) servers.

Each of these methods has certain disadvantages. For example, to load an application from a network file system, special software needs to be run on the file server. Moreover, mechanisms need to be set up to configure firewalls and proxy servers to allow the network file system protocols to pass through gateways and firewalls. Application installation servers are also special servers, and thus suffer from the same deployment problems as network file systems.

In addition, when loading an application, for example a game application, with contemporary file systems there needs to be sufficient storage on the client to store the entire application. While not a problem with contemporary desktop computer systems, consumer devices such as cable television set-top boxes, satellite receivers, pocket PCs and so forth are limited in their available storage space. These devices are capable of loading and executing software packages in much the same way as a desktop computer, but lack the storage necessary to have large packages loaded onto the system, particularly in conjunction with other data needed by a user. Thus, for example, existing methods are inadequate to load applications such as disk-based games onto various platforms and/or environments having limited memory capacity.

Existing archived file systems have other drawbacks, one of which is that when attempting to load an application, the whole application needs to be retrieved from the server at once. Before the application can run, all the data needs to be transferred to the requesting client. Typically, during installation, there must be enough storage on the client to store two copies of the application, which as can be appreciated, severely restricts the applications that memory-limited consumer devices can execute.

SUMMARY OF THE INVENTION

Briefly, the present invention provides a method and system that combines efficient caching and buffering to provide a network file system, that may utilize data stored in one or more compressed image files of sequentially arranged byte stream data. The file system may be used with a data compression scheme that provides a more optimal disk layout that minimizes size and reduces seek requirements, enabling large files such as applications to be executed on memory-limited devices.

To this end, as an application requests file opens and file reads of a file system in a normal manner. A compressed file system driver determines the location of the file information on a compressed image file stored on a remote server, such as an HTTP server. The compressed file system driver may locally cache file location information by locally maintaining a directory initially accessed from within the compressed image file. From the location information, the compressed file system driver provides a set of block data (e.g., starting block and number thereof) to a net block driver in order to obtain the data. The block data is converted by the net block driver into HTTP: byte range requests or the like in order to retrieve the data from the remote server in block multiples. As the data is received by the compressed file system driver from the net block driver, it is reconverted and adjusted, e.g., decompressed, and/or with any excess block data trimmed, to match the application's request.

The net block driver can detect a pattern of sequential block accesses, and then use this information to request additional byte range data in anticipation of future block requests, thereby increasing efficiency by increasing the amount of data requested per HTTP request. Local caching of received data by the compressed file system driver, including caching directory information and the returned file data (after uncompressing if compressed) further increases efficiency. A compressed file system format optimized for sequential access is also described, that when used, further improves the efficient data access because of its sequential nature.

Other advantages will become apparent from the following detailed description when taken in conjunction with the drawings, in which:

DETAILED DESCRIPTION

Exemplary Operating Environments

Figure 1:
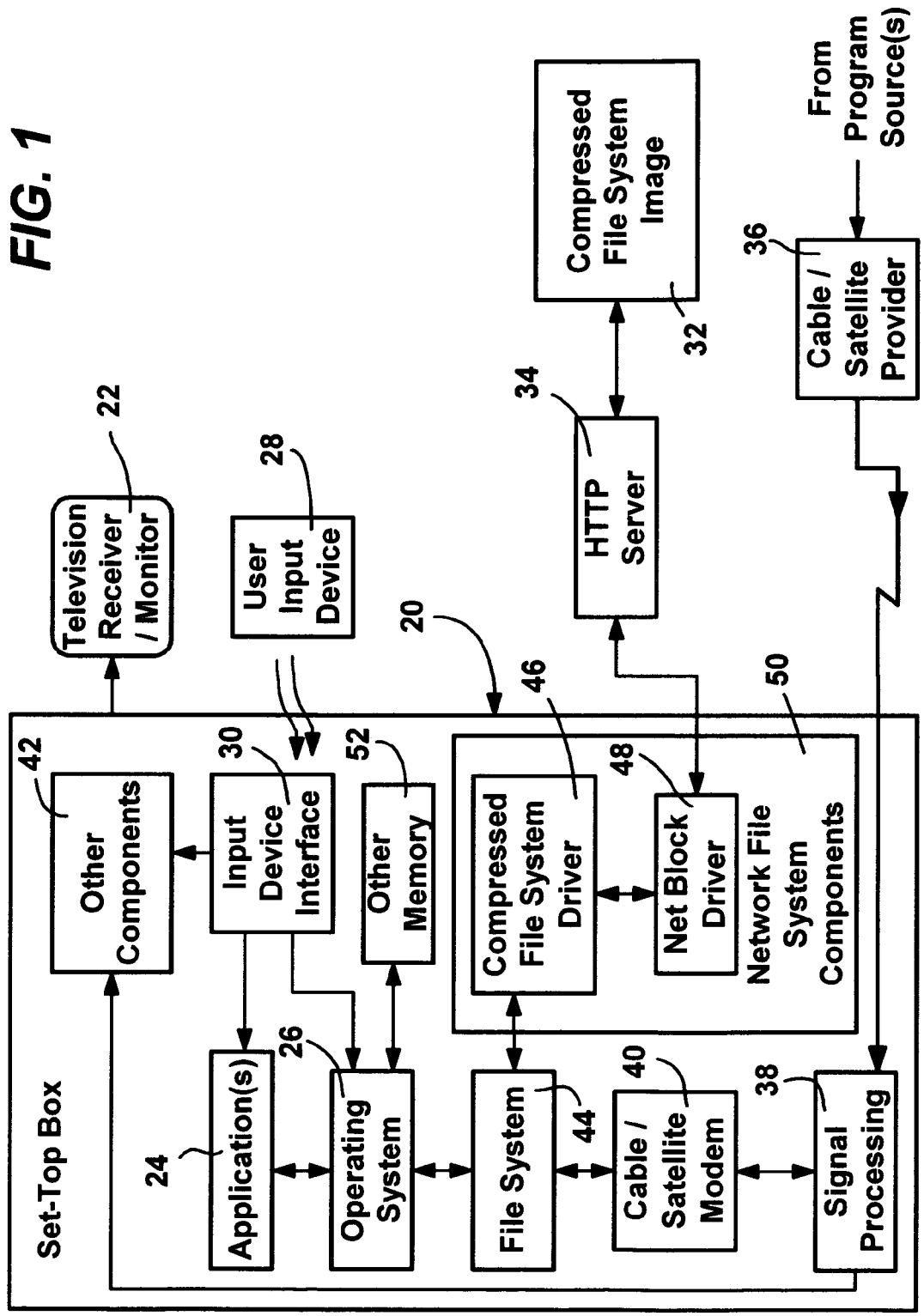
FIG. 1 is a block diagram representing a television set-top box including a computer system into which the present invention may be incorporated.
Figure 2:
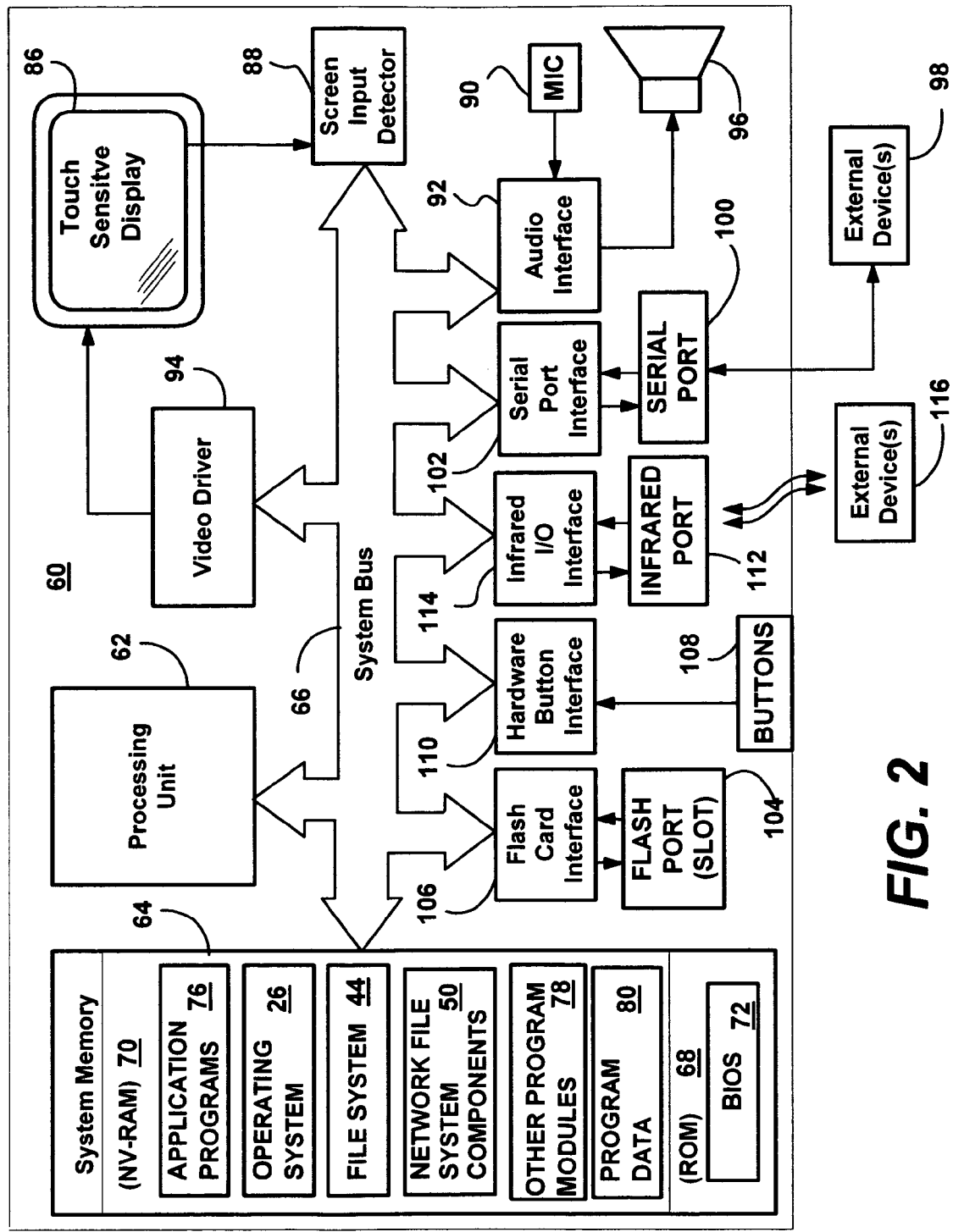
FIG. 2 is a block diagram representing another exemplary computer system into which the present invention may be incorporated.

FIGS. 1 and 2 along with the following discussion are intended to provide a brief, general description of suitable computing environments in which the invention may be implemented. Although not required, the invention will be described in the general context of computer-executable instructions, such as program modules, in one alternative being executed by a set-top box, and in another, in a pocket-sized computing device such as a personal desktop assistant. Generally, program modules include routines, programs, objects, components, data structures and the like that perform particular tasks or implement particular abstract data types.

Moreover, those skilled in the art will appreciate that the invention may be practiced with other computer system configurations, including hand-held, laptop or desktop personal computers, mobile devices such as pagers and telephones, multi-processor systems, microprocessor-based or programmable consumer electronics including a cable or satellite set-top box (FIG. 1), Pocket PCs (FIG. 2), network PCs, minicomputers, mainframe computers and the like. Part of the invention is also practiced in distributed computing environments where tasks are performed by remote processing devices that are linked through a communications network. In a distributed computing environment, program modules may be located in both local and remote memory storage devices, as described below.

Turning to FIG. 1 of the drawings, there is shown one type of computer system into which the present invention may be incorporated, implemented in a set-top box 20 connected to a television receiver/monitor 22. In FIG. 1, applications 24, one of which may, for example, provide a user interface configured to control set-up, parental control, tuning, timed operation, and/or the like may be provided. The same or another of the applications 24 may also provide a user interface via which a user is able to access the Internet, and may include a browser, although as is known, the browser may be integrated into the operating system 26 (such as Windows® CE) of the set-top box 20. A user interacts with the applications 24 and/or operating system 26 via a user input device 28 (such as an attached keypad, infrared remote control and/or hard-wired keyboard) and suitable device interface 30. Other of the applications 24 may include those maintained within a compressed image file 32 on a network HTTP server (or set of servers) 34 or the like, in accordance with one aspect of the present invention, as described in more detail below. As described herein, the present invention will primarily be described with respect to the Hypertext Transfer Protocol (HTTP), however as will be understood, other protocols will suffice.

As is known, one of the functions of a contemporary set-top box 20 is to output to the receiver/monitor 22 television programming and/or Internet content received from a provider 36. To this end, some signal processing mechanism 38 or the like is generally provided, such as including one or more splitters, filters, multiplexers, demultiplexers, mixers, tuners and so forth as required to output appropriate video to the receiver/monitor 22, and to both output and input Internet-related data via a cable/satellite modem 40. Of course, consumer satellite dishes only receive content, and thus in a satellite system an additional mechanism (e.g., telephone line, not shown) is required to output data to the provider 36. Other components 42 such as to display closed-captioning, allow parental control, provide on-screen program guides, control video recorders and so forth may be provided as is also known. In any event, these functions of set-top boxes are known, and are not described herein for purposes of simplicity, except to the extent that they relate to the network file system of the present invention. As also represented in FIG. 1, the computing device 20 includes a file system (e.g., including manager/driver components) 44.

In accordance with the present invention and as described in detail below, the computing device 20 also includes a compressed file system driver 46 and net block driver 48 (collectively network file system components 50) that enable data of the file image 32 to be read in as one or more file system files from the HTTP network server 34. As described in detail below, these components enable access to the files in a manner that is efficient, and requires the use of only relatively small amounts of other memory 52 on the computing device 20, while otherwise overcoming the problems of the prior art.

With reference to FIG. 2, an alternate exemplary computer system for implementing the invention may include a general purpose computing device in the form of a pocket-sized personal computing device 60 or the like, including a processing unit 62, a system memory 64, and a system bus 66 that couples various system components including the system memory 64 to the processing unit 62. The system bus 66 may be any of several types of bus structures including a memory bus or memory controller, a peripheral bus, and a local bus using any of a variety of bus architectures. The system memory includes read-only memory (ROM) 68 and random access memory (RAM) 70, typically non-volatile RAM (e.g., battery-backed up) in a pocket-sized personal computing device. A basic input/output system 72 (BIOS), containing the basic routines that help to transfer information between elements within the pocket-sized computer 60, such as during start-up, is stored in the ROM 68.

A number of program modules are stored in the ROM 68 and/or RAM 70, including an operating system, e.g., the same operating system 26 of FIG. 1, (such as Windows® CE), one or more application programs 76, other program modules 78 and program data 80. In accordance with one aspect of the present invention, the network file system components 50 (similar or identical to those in FIG. 1) work with a suitable file system/manager/driver 44 to provide access to network file information, e.g., from the HTTP network server 34 (FIG. 1). These components 50 generally include the compressed file system drive 46 and net block driver 48 of FIG. 1, although as can be readily appreciated, the actual network file system components 50 in use in a given system may vary depending on a particular environment and/or other optional factors as described below. For example, the net block driver 48 is essentially used for operating with remote servers, and thus would not be needed for a compressed file system image maintained in local storage.

A user may enter commands and information into the hand-held computer 60 through input devices such as a touch-sensitive display screen 86 with suitable input detection circuitry 88. Other input devices may include a microphone 90 connected through a suitable audio interface 92 and physical (hardware) or a logical keyboard (not shown). The output circuitry of the touch-sensitive display 86 is also connected to the system bus 66 via video driving circuitry 94. In addition to the display 86, the device may include other peripheral output devices, such as at least one speaker 96 and printers (not shown).

Other external input or output devices 98 such as a joystick, game pad, satellite dish, modem or the like (satellite, cable or DSL interface), scanner or the like may be connected to the processing unit 62 through an RS-232 or the like serial port 100 and serial port interface 102 that is coupled to the system bus 66, but may be connected by other interfaces, such as a parallel port, game port or universal serial bus (USB). Such devices may also be internal. The hand-held device 60 may further include or be capable of connecting to a flash card memory (not shown) through an appropriate connection port (e.g., slot) 104 and interface 106. A number of hardware buttons 108 such as switches, buttons (e.g., for switching application) and the like may be further provided to facilitate user operation of the device 60, and are also connected to the system via a suitable interface 110. An infrared port 112 and corresponding interface/driver 114 are provided to facilitate communication with other peripheral devices 116, including other computers, network connection mechanism (e.g., modems or the like), printers, and so on (not shown). It will be appreciated that the various components and connections shown are exemplary and other components and means of establishing communications links may be used.

Compressed File System

In one embodiment described herein, the present invention utilizes a compressed file system archive file format, referred to herein as CompressFS, which represents a file system. As described below, the format enables individual files to be accessed by a series of sequential reads. The files may be stored in a compressed form in an image, such as the image 32 of FIGS. 1, 3 and 4. Further, directories of files can be read without reading the entire image file. This provides numerous advantages relative to existing file system formats, particularly when transmitting remote data. Nevertheless, as will be understood, the present invention may be utilized with many alternative file system mechanisms, including tar files, CAB files, ZIP files and so forth.

Figure 3:
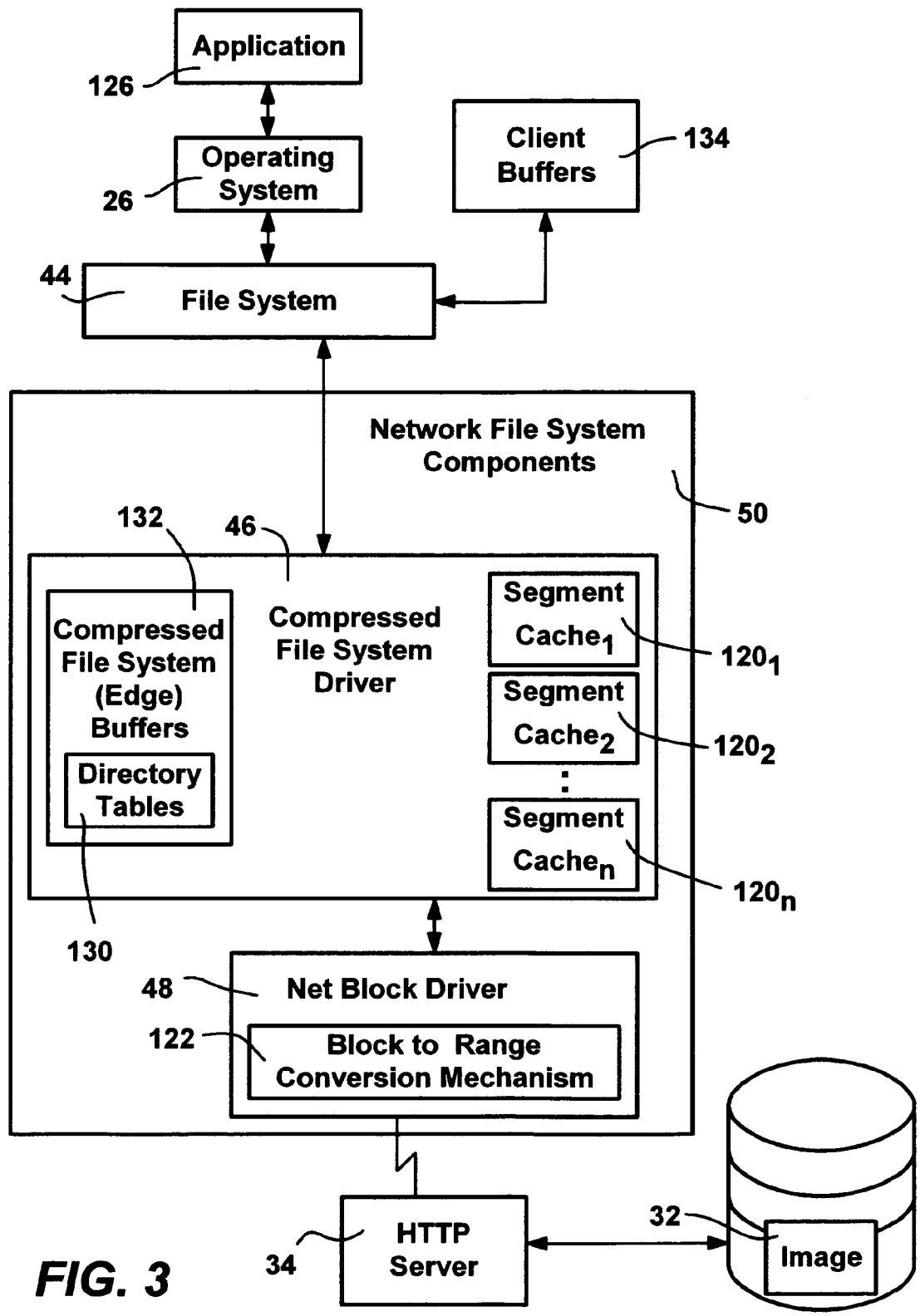
FIG. 3 is a block diagram generally representing a network file system installation in accordance with one aspect of the present invention.

In general, in the CompressFS format, a hierarchical collection of files is combined into a single compressed image file 32 to be used by the compressed file system driver 46 (FIG. 3). As described below, the image file 32 internally contains a full directory structure, enabling the compressed file system driver 46 to locate named files contained within the image 32. Individual files within the image 32 may or may not be compressed, which may be optionally determined by a user preparing the image. For example, certain files such as JPEG files are already compressed, and thus further compression provides no real benefit. Although not necessary to the present invention, a tool may be provided to facilitate the combination of the files into the compressed image file 32. For example, such a tool may contain algorithms to detect the kind of data being compressed and to automatically select a compression method that is best suited to that data. This is of particular interest with executable (.exe) files, as by selecting the right compression method, the executable images may be laid out in such a way that requests coming from the operating system's virtual memory subsystem that brings in parts of the executable as needed, align perfectly with segment caches $120_1$-$120_n$ and edge buffers 132 (of FIG. 3 and described below) maintained by the compressed file system driver 46. This can increase efficiency of the caches and eliminate many redundant accesses to the net block driver 48, which as will be understood, improves total throughput.

In the CompressFS format, at a fundamental level, the media layout is organized on a byte stream instead of the block stream used by typical file systems, which eliminates the space inherently wasted by block-based designs. Additional space savings may be achieved by storing file names in ASCII, instead of Unicode, when possible. In general, the information is laid out to maximize file opening and reading performance, at the cost of slowing directory scanning. However, in this format, directory information is clustered tightly together and contains only the information needed when opening a file, i.e., the filename and the location of the file header on disk. Combined, the space savings and tightly-packed directory tables significantly reduce the amount of data that needs to be transferred from the media when parsing the file system to open a file. In keeping with the present invention, file data is organized linearly on the disk, which helps data streaming over a network.

The following generally describes the format of data within a CompressFS image, wherein at the beginning of a CompressFS disk, there is an instance of a Disk structure. The Disk structure describes the disk as a whole, including a checksum for the entire disk, a creation date, and a count of the number of logical volumes that the image contains. The d_EntryTablePos field of the Disk structure indicates where in the image to find an array of Dir structures representing the root directories of the volumes for the image. The names of these root directories are actually the names of the volumes.

```
/* a disk descriptor, appearing once at offset 0 of an image */
typedef struct
{
    DWORD       d_Magic;                /* magic cookie, must be */
                                        /* CompressFS_Magic */
    DWORD       d_Checksum;             /* checksum of entire disk */
    DWORD       d_DiskSize;             /* size in bytes of entire */
                                        /* disk */
    WORD        d_DirEntrySize;         /* size of a Dir structure */
                                        /* on this disk */
    WORD        d_FileEntrySize;        /* size of a File */
                                        /* structure on this disk */
    WORD        d_SegmentEntrySize;     /* size of a Segment */
                                        /* structure on this disk */
    WORD        d_ShortSegmentEntrySize;/* size of a ShortSegment */
                                        /* structure */
    FILETIME    d_CreationTime;         /* creation time of disk */
    WORD        d_Flags;                /* control flags for disk, */
                                        /* 0 for now */
    WORD        d_NumRootEntries;       /* # of logical volumes on */
                                        /* this disk */
    DWORD       d_EntryTablePos;        /* absolute disk position */
                                        /* of entry table */
} Disk;
/* magic identifier for CompressFS media */
#define CompressFS_Magic 0xCF5DCF5D
/* maximum # characters in a name string on CompressFS media */
#define CompressFS_MaxNameSize 64
```

A Dir structure indicates the number of subdirectories it contains, as well as the number of files it contains. The d_EntryTablePos field of the Dir structure indicates where in the image to find an array of Dir structures, followed by an array of File structures. The number of entries in each array is indicated respectively by the d_NumDirEntries and d_NumFileEntries fields of the Dir structure.

```
/* a directory entry */
typedef struct
{
    Entry d_Entry;              /* common data */
    WORD d_NumDirEntries;       /* # of subdirectory entries in table*/
    WORD d_NumFileEntries;      /* # of file entries in table */
    DWORD d_EntryTablePos;      /* absolute image position of */
                                /* entry table */
} Dir;
/* an entry within a directory */
typedef struct
{
    BYTE e_Flags;               /* control flags for entry */
    BYTE e_Compression;         /* compression type of entry */
} Entry;
/* flags for the Entry.e_Flags field */
#define ENTRY_FLG_UnicodeName   (1 << 0)    /* entry's name is */
                                            /* in Unicode */
#define ENTRY_FLG_ShortSegments (1 << 1)    /* entry uses */
                                            /* ShortSegment */
/* types of compression for the Entry.e_Compression field */
#define ENTRY_COMPRESSION_None 0
#define ENTRY_COMPRESSION_LZJ64 1
```

A File structure indicates the location in the image of the file's data, which is stored contiguously. The file's data starts with an array of Segment structures that specify the size of each compressed chunk within the file. Following this array comes the actual client-level file data. The names of files or directories are stored within the table mentioned above, following each member of the array. Thus, after each File or Dir structure comes a NUL-terminated string which is the name of that entry, either in Unicode or ASCII, depending on the entry's header. At present, the maximum length of an entry name on a CompressFS volume is CompressFS_MaxNameSize (64).

```
/* a file entry */
typedef struct
{
    Entry f_Entry;              /* common data */
    WORD f_NumSegments;         /* # of compression segments */
    DWORD f_DataPos;            /* absolute image position of entry's data
*/
} File;
/* a file compression segment */
typedef struct
{
    DWORD s_CompressedSize;     /* compressed size of */
                                /* segment data in bytes */
    DWORD s_UncompressedSize;   /* uncompressed size of */
                                /* segment data in bytes */
} Segment;
/* a short version of a file compression segment */
typedef struct
{
    WORD ss_CompressedSize;     /* compressed size of segment */
                                /* data in bytes */
    WORD ss_UncompressedSize;   /* uncompressed size of */
                                /* segment data in bytes */
} ShortSegment;
```

File and Dir structures are prefixed with a common Entry structure. The e_Flags field of an Entry structure specifies whether the entry's name is stored in Unicode or ASCII. The e_Compression field indicates which type of compression was used to compress the entry's data. The size of the File, Dir and Segment structures may be called to grow in the future. As a result, indexing into tables of these structures is done using the structure size values specified in the Disk structure (i.e., the d_FileEntrySize, d_DirEntrySize, and d_SegmentEntrySize fields of the Disk structure).

Network File System

Figure 4:
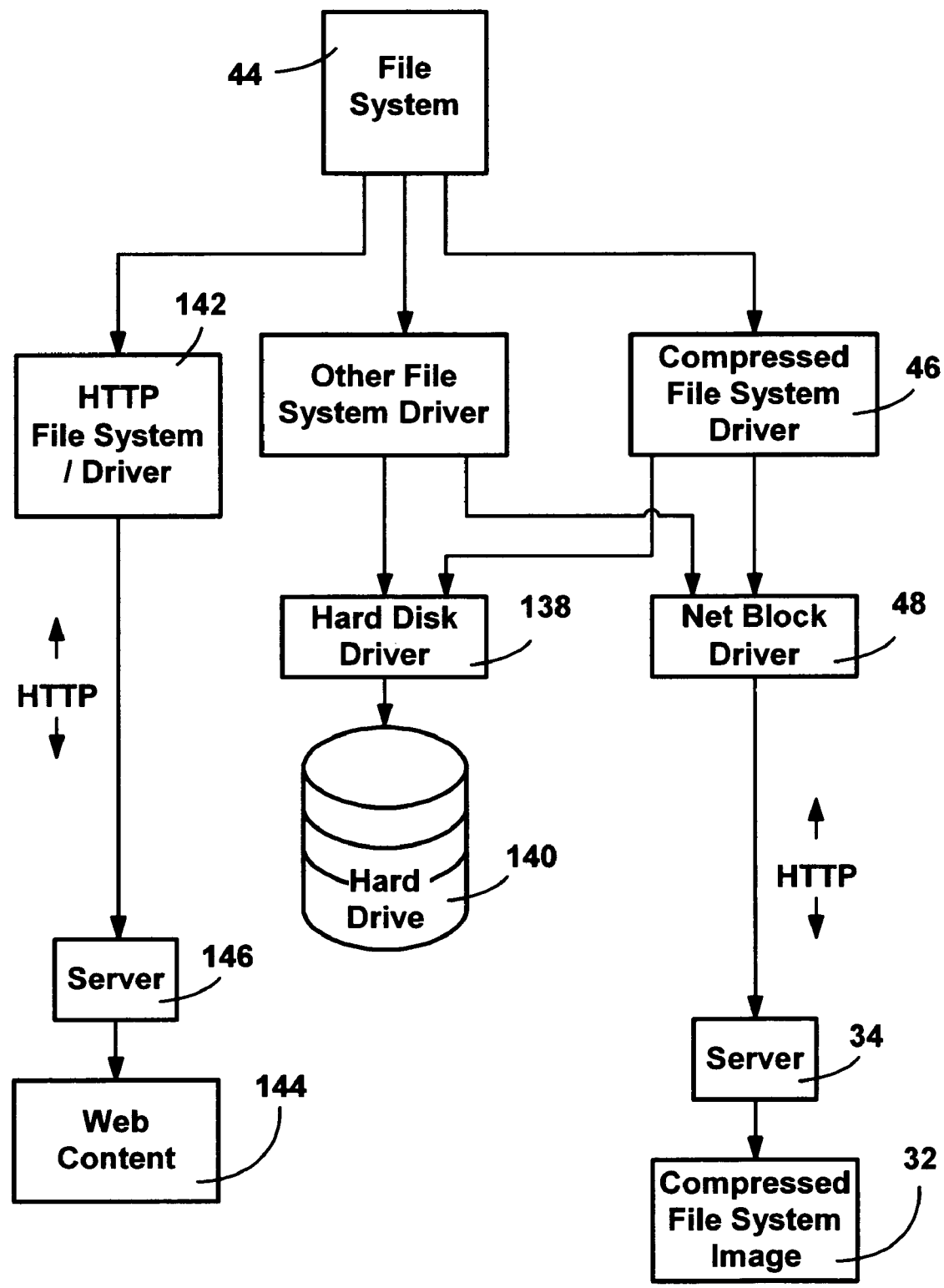
FIG. 4 is a block diagram generally representing alternative network file system installations in accordance with another aspect of the present invention.

Turning to FIGS. 3 and 4 of the drawings, the present invention is generally directed to efficiently accessing file data that is stored on an HTTP server 34 (FIGS. 1, 3 and 4) or the like in a suitable format, such as the above-described CompressFS format. In this manner, large applications including any accompanying files can be loaded for execution on a client computing device without requiring the entire set of application files to be present on the client device. As will be understood, although HTTP has many favorable characteristics that make it particularly useful for transferring data from servers to clients, (e.g., it works with existing network proxy and firewall configurations), HTTP is only one such protocol that may be used for data communications with the network file system of the present invention, as other protocols, such as FTP, are feasible. Similarly, while one suitable, compressed format (CompressFS) for storing file image data is described herein, it is understood that the file data may be stored on the server (e.g., the server 34) in many other formats such as ZIP. Regardless of the various formats used, however, existing applications and/or operating systems are able to access the data through normal file system operations, e.g., via API calls to the file system 44 (FIG. 3). Similarly, the server or servers that provide the data need not be modified to provide the requested data, e.g., HTTP servers simply respond to HTTP 1.1 "GET" requests, (or alternatively may retrieve data via scripts interpreting information appended to a Uniform Resource Locator, or URL), as described below.

FIG. 3 shows one implementation of the present invention, in which an application 126 and/or any of its associated files reside within the image file 32 (e.g., in the CompressFS format), and is launched by the operating system 26. As will be understood, the operating system only needs to load relevant parts of the application in memory at any given instant, with other parts of the application being streamed or locally or remotely cached, thus enabling very large applications to be run on limited memory devices. Note that the application 126 and operating system 26 shown in FIG. 3 (and similarly in FIG. 4) may be identical or similar to similar components represented in FIGS. 1 and 2, but need not be, as the present invention may be practiced in many environments and on many platforms. Moreover, the present invention is primarily described with respect to a read-only file system, however, as can be appreciated, the application 126 will also be able to write file data to the server 34. The written files can be separately maintained or directly written into the CompressFS image file (assuming security issues are dealt with). Also, if desired, a utility can be run on the servers to add such files to the CompressFS image file at appropriate times, e.g., during times of low demand.

As is typical in many computing environments, the file system 44 mounts a drive volume in order to access the file data therein. The file system 44 may mount the volume at some appropriate time, including at system startup, or when a file is first requested from a drive volume, e.g., via a path\filename. An ActiveX® control, or command prompt command may be used to mount the file system. In this manner, a user and the applications can access a file by drive letter or subdirectory without knowing its actual location.

One suitable file system 44 may comprise the Windows® CE file system, in which the file system 44 is associated with a file system driver. For example, in a Windows® CE environment, the application places an API call to the operating system kernel, which passes the request to a file system manager (not separately shown). In turn, the file system manager sends the request to an appropriate file system driver. Thus, a request directed to the compressed file system results in the file system manager calling the compressed file system driver 46 to handle the request. As can be readily appreciated, other operating system and/or file systems may perform essentially equivalent operations, and there is no intent to limit the present invention to the Windows® CE operating system and/or file system.

In the situation wherein the file system 44 determines that the file information is remote, the compressed file system driver 46 communicates with the block-level driver 48 to obtain the directory information of the remote volume. In the compressed file system described above, the data describing a particular directory is clustered together. This enhances the caching efficiency, making file open operations faster. More particularly, the compressed file system driver 46 requests the net block driver 48 to retrieve the appropriate directory information for the requested file, and may then cache the returned (tightly-packed) directory information in directory tables 130 maintained within its edge buffers 132. The directory information may be cached at the time that the volume is mounted. As shown in FIG. 3, the directory tables 130 and/or edge buffers 132 may be included within the compressed file system driver 46, but alternatively may be external thereto.

In general, the compressed file system driver 46 uses block-based buffering to eliminate redundant reads of disk blocks. When reading a span of bytes from the media, only the head and tail portions of the span are maintained in the buffers 132. Other data is sent directly into the higher-level client buffers 134. This arrangement hides much of the overhead of being a byte-based format. It also makes the tightly-packed directory tables 130 efficient to manipulate, since these tables 130 will normally fit completely into a single buffer. The compressed file system driver 46 also uses a variable number of segment caches $120_1$-$120_n$ to keep the most-recently accessed (or possibly most-frequently accessed) portions of a file in memory in uncompressed form. As can be appreciated, this makes small sequential access throughout the file very efficient, eliminating a significant amount of media access and computation time to decompress the data. When not available via a cache, such as initially, to efficiently read the compressed file system data, the compressed file system driver 46 interfaces between the operating system 26/file system 44 and the net block device driver 48. As shown in FIG. 3, the segment caches $120_1$-$120_n$ may be included within the compressed file system driver 46, but alternatively may be external thereto.

In accordance with one aspect of the present invention, the net block device driver 48 is constructed to communicate with the appropriate server type, e.g., HTTP servers as described herein. To reduce round-trip delays when reading from the server, the net block device driver 48 retrieves block-sized amounts of data from the underlying store, e.g., from the compressed file system archive that is stored on the HTTP server at a given URL. As described herein, a block is a sequence of bytes, which may be any size, but is typically some power of two, such as 512 bytes in length. Blocks start on a boundary that is evenly divisible by the block's size.

In the CompressFS format, reading data from the net block device driver 48 is performed in terms of full blocks. Thus, for example, if blocks are 512 bytes in size, then reads from the net block device driver 48 are a multiple of 512 bytes in size, starting at a multiple of 512 bytes from the beginning of the media. Note that normal file systems organize their meta-data structures around this block-based organization. However, to maximize compression efficiency, and indirectly enhance bandwidth, the CompressFS format virtualizes the block nature of block drivers into a pure stream of bytes. Moreover, one feature of CompressFS includes sequential segment storage, wherein a compressed file is divided into variable-sized segments. The set of segments that make up a file are stored in sequential order within the CompressFS image file. This maximizes throughput when the segments are read, since it eliminates the need to seek to a different position.

In accordance with another aspect of the present invention, to make the above mechanism practical, the compressed file system driver 46 implements an edge buffering scheme. More particularly, whenever the compressed file system driver 46 needs to read a span of bytes from the net block device driver 48, the lower-level of the compressed file system driver 46 converts the requested set of bytes into the set of blocks that actually encompass the bytes requested. The net block device driver 48 then transfers the data requested, as described below. The first and last blocks within the transfer may contain some data that the compressed file system driver 46 does not need at the present moment. These two blocks are buffered for later use.

This method of buffering data coordinates well with the structure of the CompressFS format. For example, it naturally buffers directory entries as files are opened. This improves performance of subsequent file open operations since much of data is already present in the buffers, and there is no need to retrieve it via the net block device driver 48 again.

The buffering method also helps file read performance. As described above, in the CompressFS format, the list of segments that make up a file is stored at the beginning of the file, before the segment data itself. The act of opening a file typically results in the entire segment list being loaded into the edge buffers 132. This means that as a file is read, there is usually no need to seek back to the beginning of the file to read the next segment's position.

In order to obtain the remote data, the net block device driver 48 includes a conversion mechanism 122 that converts the file system block requests to an HTTP 1.1 GET request using the Range: header in order to retrieve a sequence of bytes from the image file. For example, if 512-byte blocks are employed, a request for two blocks of data starting at the third block is converted to request data from a URL via an HTTP GET request, identifying the range 1024 to 2047. Alternatively, the server may use a CGI script, with the byte range information appended to the end of the URL, e.g., start=1024&length=1024. In one optimization, the TCP/IP connection may be held open (via a keep-alive request) after each request, so that multiple, sequential requests are processed on the same connection. As is understood, this saves the time that it takes to create and destroy TCP/IP connections. Note that this same mechanism can work with other transports, such as the secure socket stream protocol in https:.

Moreover, the net block device driver 48 may implement a number of enhancements that make data transfer more efficient. For example, in many instances, such as when an application code file is being loaded, or when a data file is being read into a buffer, a series of requests for sequentially increasing groups of blocks will be made by the compressed file system driver 46. The net block device driver 48 preferably includes logic that detects such sequential or other patterns, and in anticipation of further requests, request larger sequences of bytes from the HTTP server 34. As a result, the round-trip delays inherent in HTTP requests may be amortized over more data, increasing throughput. Note that the net block device driver 48 does not have to provide storage for the large request, since HTTP is a stream protocol, whereby the requested data can be read in small chunks, directly into the buffers provided by the compressed file system driver 46. Nevertheless, such enlarged requests are speculative, and as a result, in many cases, not all of the data will be used by the compressed file system driver 46. Thus, when a non-sequential block is requested, the net block device driver 48 discards unused but already requested data once it is received from the HTTP stream. This may be done by reading the unneeded data into a dummy buffer from where it is discarded, which works particularly well for small amounts of data or high-speed connections. Alternatively, the HTTP stream can be closed and re-opened, which works well for large amounts of data or low speed connections.

To further increase efficiency, the compressed file system driver 46 may maintain one or more segment caches $120_1$-$120_n$ of decompressed segments. More particularly, whenever the compressed file system driver 46 needs to access some bytes from a particular file, it locates the segment that contains the relevant data, reads and decompresses the segment into memory, and then gets the bytes it needs out of memory. By maintaining one or more caches of decompressed segments, the compressed file system driver 46 can take advantage of the likelihood that an application reading data from a particular segment will often want to read more data from the same segment. Maintaining such decompressed segments in local system memory eliminates the need to repeatedly read and decompress the same segments, which greatly boosts performance.

FIG. 4 shows alternate ways in which the present invention may be implemented. For example, the compressed file system driver 46 may be arranged (e.g., via a hard disk driver or the like 138) to read directly from a local storage 140 rather than having the block driver 48 convert block requests to URL GET requests or the like to access the HTTP server 34. As can be appreciated, file systems/disk drivers 138 are already set up to read blocks (e.g., sectors, clusters) from a hard disk drive, and thus the compressed file system driver 46 need only provide the block requests to the disk driver 138 to implement such a scheme.

In another alternative shown in FIG. 4, an HTTP file system 142 may be implemented directly in the HTTP components typically present in computing devices. In such an implementation, a file system read request is mapped to a URL range request or the like, whereby web content 144 may be retrieved and returned by a suitable server 146 in a normal manner. In keeping with the present invention, the content is then adjusted to match the application's file system request, as generally described above, (although without image decompression).

Moreover, the present invention can be adapted for write access. For example, the application can write to a file, which the net block driver 48 sends to the HTTP server 34. Such written files (e.g., game data) may be maintained by the server in a known manner.

As can be readily appreciated, the resulting virtualized file system appears to the application to be like any other file system. Significantly, existing application programs need not be modified, although if desired, new applications can be enhanced to use sequential access patterns when possible to take advantage of the sequential data access. Moreover, the application itself need not be stored on the local system, as the code and data is kept on the server, and only loaded into the client RAM when the application is run, yet because of the streaming, large sequential file accesses do not require extra storage space on the client.

Figure 5:
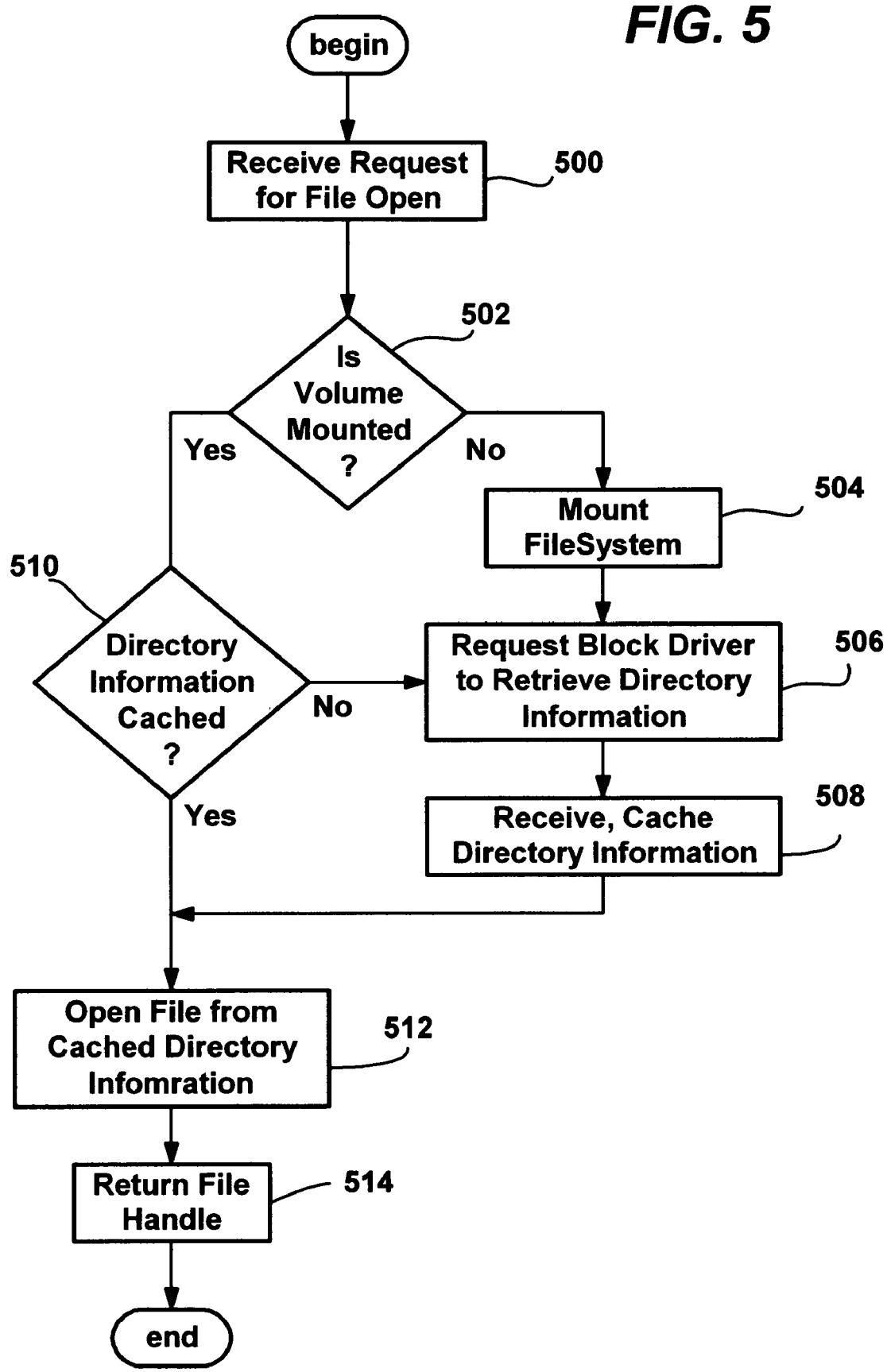
FIG. 5 is a flow diagram generally representing logical steps when opening a file from a network file system in accordance with another aspect of the present invention.
Figure 6:
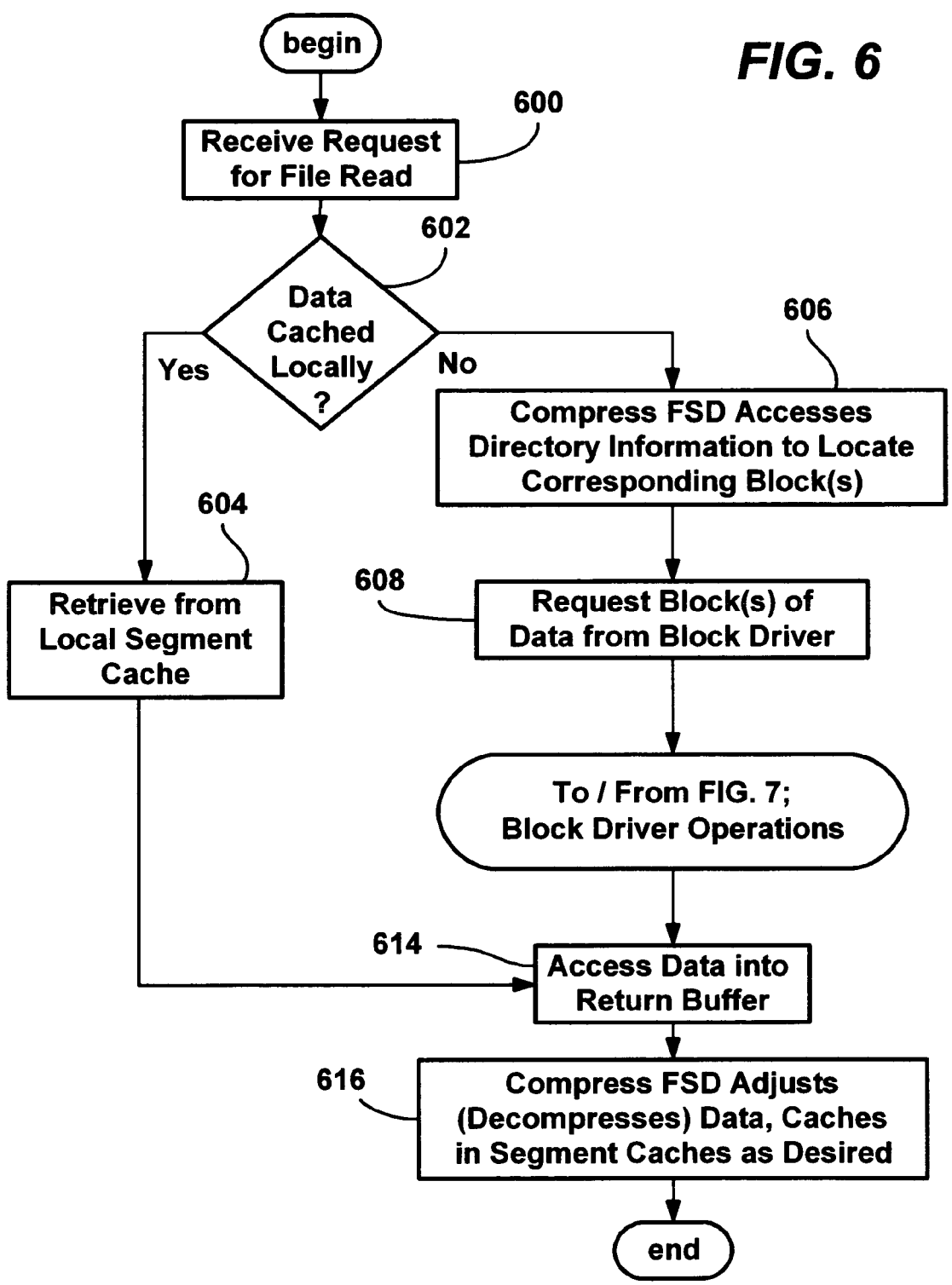
FIGS. 6 and 7 comprise an exemplary flow diagram generally representing logical steps when reading a file from a network file system in accordance with an aspect of the present invention.
Figure 7:
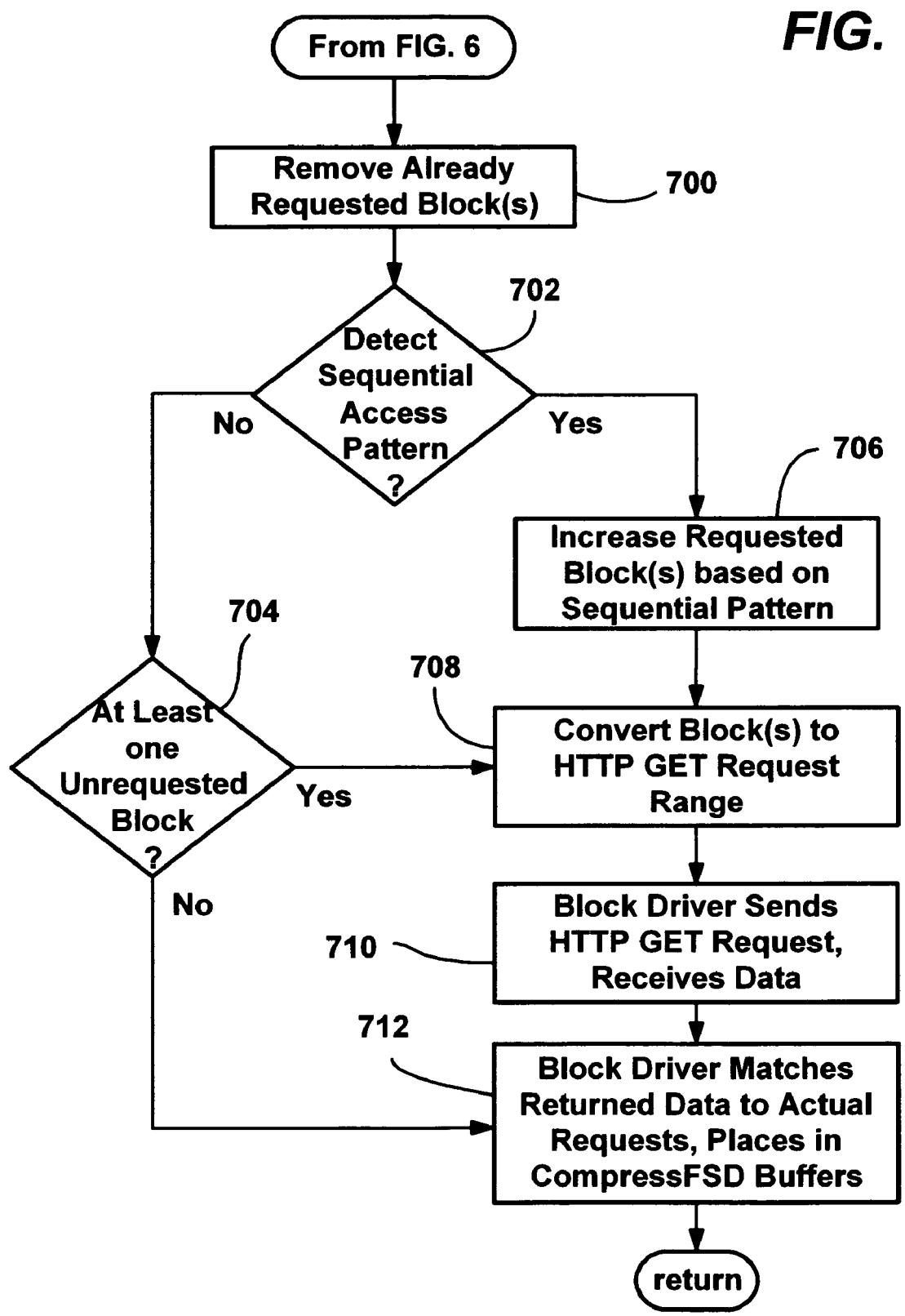

Turning to an explanation of the operation of the present invention with particular reference to the flow diagrams of FIGS. 5-7, FIG. 5 represents general logic performed when a file open request is received for a remote file (step 500). If the volume is not mounted, steps 502-508 are executed, to mount the volume and send the block information from the compressed file system driver 46 to the net block driver 48 in order to obtain the directory information for the volume. Step 508 caches this information in the edge buffers 132 (described above). If at step 502 the volume was already mounted, step 510 is executed to determine whether the directory information is locally cached in the edge buffers 132. If not, step 510 branches to step 506 to send the block information from the compressed file system driver 46 to the net block driver 48 in order to obtain the directory information for the volume, which is then cached (step 508).

Once the directory information is present in the edge buffers 132, the file location is determined (e.g., via a further block read) and the file is opened as normal (step 512) from the application's perspective, including returning a file handle to the file (step 514) assuming no errors occurred, e.g., an access violation. At this time, the directory information for locating the file and other files that were stored therewith in the CompressFS format (or the like) is locally present.

FIGS. 6 and 7 comprise a flow diagram for reading from an opened file, beginning at step 600 wherein a request to read some section of data of a file (e.g., identified by the handle returned at step 512). As described above, the compressed file system driver 46 may maintain one or more segment caches $120_1$-$120_n$ to substantially increase performance. If the requested data is cached as determined by step 602, then step 602 branches to step 604 to retrieve the data from the appropriate cache, and then place it into the client buffers 134, whereby success status is returned (not separately shown) and the read request is satisfied. Note that some, but not all of a requested section of data may be cached, in which event the compressed file system driver 46 can satisfy part of the request from the cache, and request the other portion or portions via the net block driver 48, as described below.

If at step 602 the request cannot be satisfied from the cache, the compressed file system driver 46 accesses the directory information to determine which blocks are needed to satisfy the read request. Note that if this information is not available locally, then the compressed file system driver 46 first needs to communicate with the net block driver 48 to obtain this information. In any event, once known at step 606, the compressed file system driver 46 converts the byte offset and length provided by the application in its read request to the corresponding block or blocks at step 608, requesting more data if necessary to match the request to a complete block as generally described above. The URL, which generally corresponds to the filename, is also provided.

In one implementation, the block driver 48 can do a simple conversion from the block information to the HTTP range that is being requested, however as mentioned above, the block driver can also anticipate certain upcoming requests and thereby increase overall throughput. FIG. 7 represents the steps taken by the block driver to try to intelligently anticipate future read requests.

At step 700, it may be possible that the compressed file system driver 46 has requested a block that the net block driver 48 has already requested via prior anticipation. If so, there is no need to again request the same range, as the requested block (or blocks) will come in within the returned stream of data, and thus this block (or blocks) may be removed from the set that need to be converted to one or more data ranges requested from the HTTP server. Note however that if the removal results in a gap within a larger range, it may be more efficient to simply request the entire range including the already requested block. At step 702, the net block driver 48 looks to see whether the compressed file system driver 46 has been requesting blocks in some predictable pattern, (e.g., sequentially), in which event the compressed file system driver 46 can intelligently anticipate the next block (or blocks) that will be requested. If so, the anticipated blocks can be combined with the requested blocks and then converted into a single, enlarged range request at step 706.

If at step 702 a pattern was not detected, then it is possible that because of prior anticipation, no blocks remain to be requested, i.e., they were already requested and thus removed at step 700. Note that this is unlikely with sequential patterns, as one correct guess leads to another guess, while an incorrect guess will not result in removal of any blocks at step 700. In any event, if at least one block needs to be requested (step 704), step 708 is executed to convert the block set into an HTTP range request or the like as described above. Step 710 then represents the making of the request and the receipt of the data from the server (assuming no errors). Lastly, step 712 represents the adjusting of the data placed into the compressed file system driver buffers (e.g., edge buffers 132) so that the received data matches that requested. For example, as described above, if a block was requested in anticipation of sequential access, but the guess turned out to be incorrect, the net block driver 48 discards this data. Other data may have been already received and buffered in correct anticipation of a request, and such data can be added to the data returned to the compressed file system driver 46.

Returning to steps 614 and 616 of FIG. 6, once the requested data is in the buffers 132 of the compressed file system driver 46, the compressed file system driver 46 can adjust the data as necessary to match the read request, e.g., decompress as necessary and then hold back extra data that was returned via the above-described edge-buffering scheme. Thus, only the application-requested data is placed into the client buffers 134, whereby the application accesses the data as expected. As also represented at step 616, the compressed file system driver 46 can cache the (decompressed) data as desired in its segment buffers, including any extra data, in anticipation of future requests.

Lastly, a number of enhancements to the present invention are feasible, and indeed, may be implemented in order to improve efficiency in a given configuration. For example, as described above, the block driver 48 can request extra data in its HTTP request, however it may use many different algorithms to determine how much additional data should be requested. The amount may even be adjusted dynamically, e.g., double each time a sequential block is requested, and reset to some default number (or alternatively halve) when a non-sequential block is requested. Average round-trip times and other factors, (e.g., historical data) can also be used to determine the extra amount of data requested.

Further, multiple HTTP connections can be made between the client and server, enabling some improvements, including, for example, requesting one chunk of data on one connection while streaming data on another, whereby the server can start processing the next request as it is sending data to satisfy the current request. If more than one file is being accessed, each could have its own connection. Also, one connection can be used for sequential access, while another may be used for non-sequential data transfer. Again, the net block driver 48 can use predicted information to increase performance.

Moreover, instead of a single compressed archive file, the file can be broken up into smaller files, independently stored on the server. This would enable servers that were unable to service byte range requests to return data in chunks of smaller size. The compressed file system archive file can be modified so that the contained files are stored as separate URLs. Also, given limited memory, the various buffer sizes can be adjusted relative to one another for a given system.

As can be seen from the foregoing detailed description, there is provided a method and system wherein a client device has access to remote file system with large storage capacity, possibly sequential and remote, in a manner that is fast, efficient and transparent to applications. The method and system are particularly valuable for running large applications on devices with limited storage, and in many implementations, requires no (or trivial) modification to network servers. Indeed, if a client device has web service, it can implement the present invention.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method for accessing data stored on a remote server, the method comprising:
 receiving a file system request for data at a client device, the request being in a first format operable to be used in a computer file system environment;
 determining that the data is stored on a remote volume of a remote server;
 generating a first remote transfer protocol request in a second format operable to be used in a computer network environment, the remote transfer protocol request requesting directory information of the remote volume;
 communicating the first remote transfer protocol request to the remote server;
 receiving the directory information from the remote server in response to the first remote transfer protocol request;
 caching the received directory information in a local storage of the client device;
 using the cached directory information, determining the location of the data within the remote volume and generating a second remote transfer protocol request in the second format, the second remote transfer protocol request requesting the data;
 communicating the second remote transfer protocol request to the remote server;
 receiving the data from the remote server in response to the second remote transfer protocol request; and
 satisfying the file system request based on the data received in response to the second remote transfer protocol request.

2. The method of claim 1 wherein the remote transfer protocol request comprises an HTTP-based request.

3. In a computer device connected to a remote server, a system comprising:
 a processor; and
 system memory storing the following:

a file system driver configured to receive file system requests in a first format for data that is stored on a remotely located volume of the remote server, the file system driver being further configured to determine file location information on the volume;

a block driver connected to the file system driver to receive block requests corresponding to file locations therefrom, and being configured to convert the block requests into byte range requests of a remote transfer protocol and communicate the byte range request to the remote server; and wherein the file system driver and the block driver perform a method to satisfy file system requests, the method comprising:

in response to receiving a file system request in the first format for data, the file system driver determining that the requested data is stored on the remote volume of the remote server, and in response, requesting that the block driver retrieve directory information of the remote volume;

the block driver generating a first remote transfer protocol request in a second format operable to be used in a computer network environment, the first remote transfer protocol request requesting directory information of the remote volume;

the block driver communicating the first remote transfer protocol request to the remote server;

the file system driver receiving the directory information from the remote server in response to the first remote transfer protocol request and caching the received directory information in a local storage of the client device;

using the cached directory information, the file system driver determining a block of data that satisfies the file system request, and in response, sending a request for the block of data to the block driver;

based on the requested block, the block driver generating a second remote transfer protocol request that includes a request for a range of data that includes the requested block;

the block driver communicating the second remote transfer protocol request to the remote server;

the file system driver receiving the range of data from the remote server in response to the second remote transfer protocol request and caching the range of data; and the file system driver using the range of data to satisfy the file system request.

4. The system of claim 3 wherein the file system driver maintains the directory information in local storage of the computer device.

5. The system of claim 3 wherein the remote transfer protocol comprises HTTP.

6. The system of claim 3 wherein the file system driver is further configured to decompress data returned from the block driver.

7. The system of claim 3 wherein the block driver includes a detection mechanism for detecting a pattern of block request.

8. The system of claim 7 wherein the detection mechanism causes the block driver to increase the size of the range of data requested in response to detection of a pattern.

9. The system of claim 3 wherein the file system request is a read request for a quantity of data, and wherein the file system driver requests a block that encompasses at least the quantity of data requested.

10. The system of claim 9 further comprising at least one edge buffer, and wherein the file system driver receives at least one block of data and maintains the data in at least one of the edge buffers.

11. The system of claim 3 further comprising a segment cache, and wherein the file system driver maintains returned data in the segment cache.

12. The system of claim 11 wherein the file system driver decompresses data, and wherein the file system driver maintains decompressed data in the segment cache.

13. The system of claim 3 wherein the computer device is connected to the remote server via the Internet.

14. The system of claim 3 wherein the file system request comprises a byte offset and a length and wherein the file system driver uses the byte offset and length to determine the block.

15. A memory having stored thereon computer-executable instructions for performing the method of claim 1.

16. The memory of claim 15 wherein the remote transfer protocol request comprises an HTTP-based request.

\* \* \* \* \*